(12) United States Patent
Minakuti et al.

(10) Patent No.: US 8,237,811 B2
(45) Date of Patent: Aug. 7, 2012

(54) IMAGING APPARATUS, CONTROL METHOD THEREOF, AND PROGRAM

(75) Inventors: Jun Minakuti, Osaka (JP); Takahiro Koyama, Kanagawa (JP); Shinya Ishibashi, Osaka (JP); Shigeru Tsujita, Osaka (JP); Masaomi Moritsu, Osaka (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 12/536,691

(22) Filed: Aug. 6, 2009

(65) Prior Publication Data
US 2010/0079616 A1 Apr. 1, 2010

(30) Foreign Application Priority Data

Sep. 26, 2008 (JP) .................................. 2008-247580

(51) Int. Cl.
*H04N 5/235* (2006.01)
(52) U.S. Cl. ................. 348/229.1; 348/333.12; 348/367
(58) Field of Classification Search ............... 348/216.1, 348/217.1, 221.1, 222.1, 229.1, 230.1, 239, 348/255, 333.01, 333.12, 362, 364, 367, 348/671, 687
See application file for complete search history.

(56) References Cited

U.S. PATENT DOCUMENTS

| | | | | |
|---|---|---|---|---|
| 7,664,382 B2 * | 2/2010 | Yamasaki | ........................ | 396/55 |
| 8,036,486 B2 * | 10/2011 | Sakurai et al. | ................ | 382/274 |
| 2003/0117518 A1 * | 6/2003 | Pyle | ............................. | 348/364 |
| 2004/0150738 A1 * | 8/2004 | Sakimoto et al. | ........ | 348/333.11 |
| 2007/0230939 A1 * | 10/2007 | Tanaka et al. | ................ | 396/155 |
| 2007/0285527 A1 * | 12/2007 | Kusayama et al. | ........ | 348/222.1 |

FOREIGN PATENT DOCUMENTS

| | | |
|---|---|---|
| JP | 2003-69897 | 3/2003 |
| JP | 2004-140484 | 5/2004 |
| JP | 2005-117395 | 4/2005 |
| JP | 2007-282134 | 10/2007 |
| JP | 2009-239599 | 10/2009 |

OTHER PUBLICATIONS

Office Action issued Sep. 16, 2010, in Japan Patent Application No. 2008-247580.
U.S. Appl. No. 12/566,127, filed Sep. 24, 2009, Minakuti, et al.
U.S. Appl. No. 12/763,456, filed Apr. 20, 2010, Ueda, et al.

* cited by examiner

*Primary Examiner* — Aung S Moe
*Assistant Examiner* — Chriss Yoder, III
(74) *Attorney, Agent, or Firm* — Oblon, Spivak, McClelland, Maier & Neustadt, L.L.P.

(57) ABSTRACT

An imaging apparatus includes: an imaging device generating an image signal on a subject image; a shooting control mechanism dividing an exposure to be made to the imaging device in an exposure period into a plurality of times of exposures; an adding mechanism adding individual image signals obtained by the plurality of divided exposures in sequence to generate a sum image signal; an amplification control mechanism amplifying the sum image signal using a predetermined amplification factor in a first period in the exposure period to generate an amplified image signal; and a display control mechanism displaying, on a display section, the amplified image based on the amplified image signal in the first period, and displaying, on a display section, an image based on the sum image signal in a period other than the first period in the exposure period.

19 Claims, 10 Drawing Sheets

| METHOD OF DETERMINATING END PERIOD OF AMPLIFIED DISPLAY PERIOD | PT1 | DETERMINE THAT END PEIROD IS TO BE A CERTAIN PERIOD |
| --- | --- | --- |
| | PT2 | DETERMINE END PEIROD IN ACCORDANCE WITH SHOOTING SENSITIVITY |
| | PT3 | DETERMINE END PEIROD SO THAT THE PERIOD IS A PREDETERMINED PERCENTAGE OF SET EXPOSURE TIME |
| | PT4 | DETERMINE END PEIROD SO THAT THE PERIOD IS A PREDETERMINED PERCENTAGE OF CALCULATED EXPOSURE TIME |
| | PT5 | DETERMINE THAT END PEIROD IS TO BE A POINT IN TIME WHEN SIGNAL LEVEL OF AMPLIFIED IMAGE SIGNAL IS SATURATED |

IMAGING APPARATUS, CONTROL METHOD THEREOF, AND PROGRAM

BACKGROUND OF THE INVENTION

1. Field of the Invention

The present invention relates to a technique for displaying an image in the process of being exposed.

2. Description of the Related Art

When a subject having a low luminance, such as a night view, a celestial body, etc., is photographed, long exposure shots having a long exposure time are taken. In such a long exposure shot, it takes a long time to obtain a shot image, and thus it takes much time to check whether a desired image has been obtained or not.

In order to address this problem, there is a technique in which an exposure in a long exposure shot is divided into a plurality of times of exposures, and a user is allowed to check a shot image in the process of being exposed on a display section each time individual exposure is terminated (for example, Japanese Unexamined Patent Application Publication No. 2004-140484). By this technique, a determination can be made on whether a desired image is obtained during the exposure, and thus it becomes possible to determine whether a captured image is good or bad in a short time.

However, in a long exposure shot, a subject has a low luminance, and thus the signal level of a displayed image is low at the beginning of the exposure, thereby making it difficult for the user to check a picture composition.

As a technique allowing the user to check a picture composition in an early stage, for example, there is a technique in which an image signal of an image in the process of being exposed is amplified, and the amplified image signal is displayed (for example, Japanese Unexamined Patent Application Publication No. 2003-69897). By this technique, even in the case of shooting a subject having a low luminance, it is possible to check a picture composition of a captured image in an early stage after the start of an exposure, and thus it becomes possible to discover a shot with an inadequate composition, or an inadvertent appearance of an unnecessary object in a picture at the early stage.

SUMMARY OF THE INVENTION

However, in the technique described in the Japanese Unexamined Patent Application Publication No. 2003-69897, an image based on an amplified image signal is displayed until the end of an exposure, and thus it becomes difficult to determine whether the amount of exposure is adequate or not by viewing the displayed image in the process of the exposure.

That is to say, in the technique described in the Japanese Unexamined Patent Application Publication No. 2003-69897, it is difficult to achieve determination on whether exposure is adequate or not, and checking of a picture composition in an early stage in the process of exposure.

Accordingly, it is desirable to provide a technique allowing the user to determine whether an adequate exposure is made and to check a picture composition in an early stage in the process of exposure.

According to an embodiment of the present invention, there is provided an imaging apparatus including: an imaging device generating an image signal on a subject image; a shooting control means for dividing an exposure to be made to the imaging device in an exposure period into a plurality of times of exposures; an adding means for adding individual image signals obtained by the plurality of divided exposures in sequence to generate a sum image signal; an amplification control means for amplifying the sum image signal using a predetermined amplification factor in a first period in the exposure period to generate an amplified image signal; and a display control means for displaying, on a display section, the amplified image based on the amplified image signal in the first period, and displaying, on a display section, an image based on the sum image signal in a period other than the first period in the exposure period.

According to another embodiment of the present invention, there is provided an imaging apparatus including: an imaging device generating an image signal on a subject image; a shooting control means for dividing an exposure to the imaging device into a plurality of times of exposures; an adding means for adding individual image signals obtained by the plurality of divided exposures in sequence to generate a sum image signal; an amplification means for amplifying the sum image signal using a predetermined amplification factor to generate an amplified image signal; and a display control means for alternatively displaying, on a display section, an amplified image based on the amplified image signal and a sum image based on the sum image signal in accordance with a switching instruction.

By the present invention, it becomes possible for the user to determine whether an adequate exposure is made and to check a picture composition in an early stage in the process of exposure.

BRIEF DESCRIPTION OF THE DRAWINGS

FIG. 10 is a diagram illustrating individual methods for determining an end period of an amplified display period;

DESCRIPTION OF THE PREFERRED EMBODIMENTS

1. First Embodiment

In the following, a description will be given of a first embodiment of the present invention with reference to the drawings.

1.1 Configuration

Figure 1:
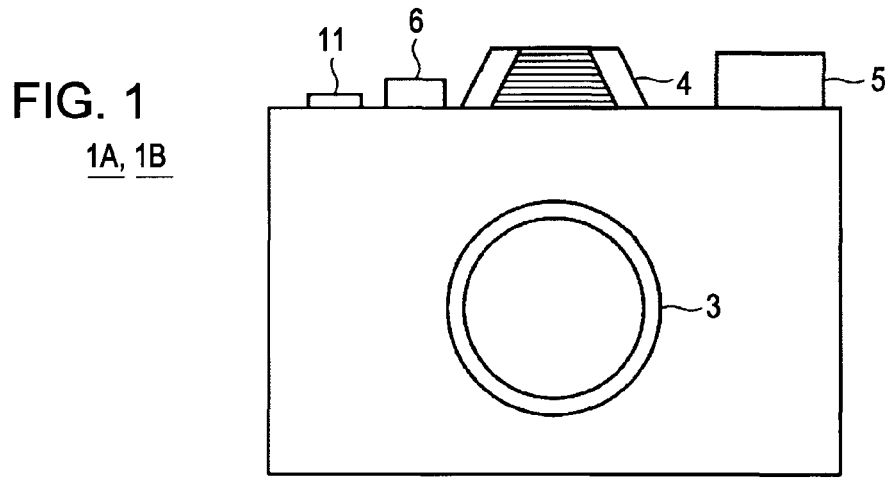
FIG. 1 is a diagram illustrating an outer view of an imaging apparatus according to a first embodiment.
Figure 2:
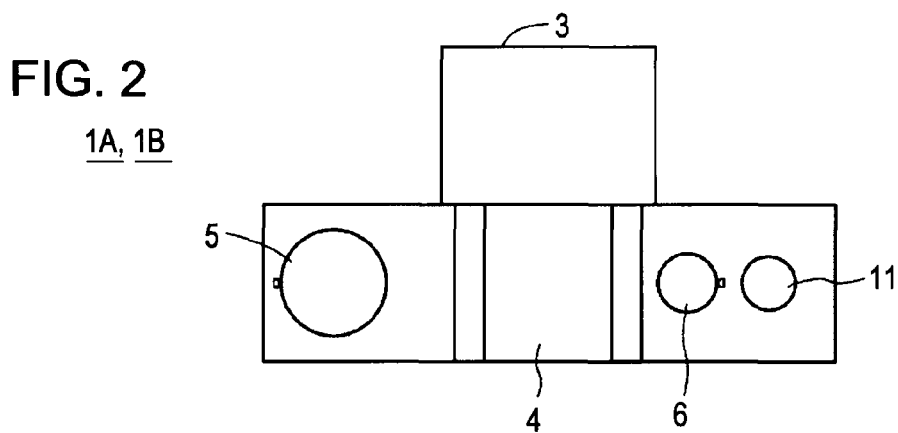
FIG. 2 is a diagram illustrating an outer view of the imaging apparatus according to the first embodiment.
Figure 3:
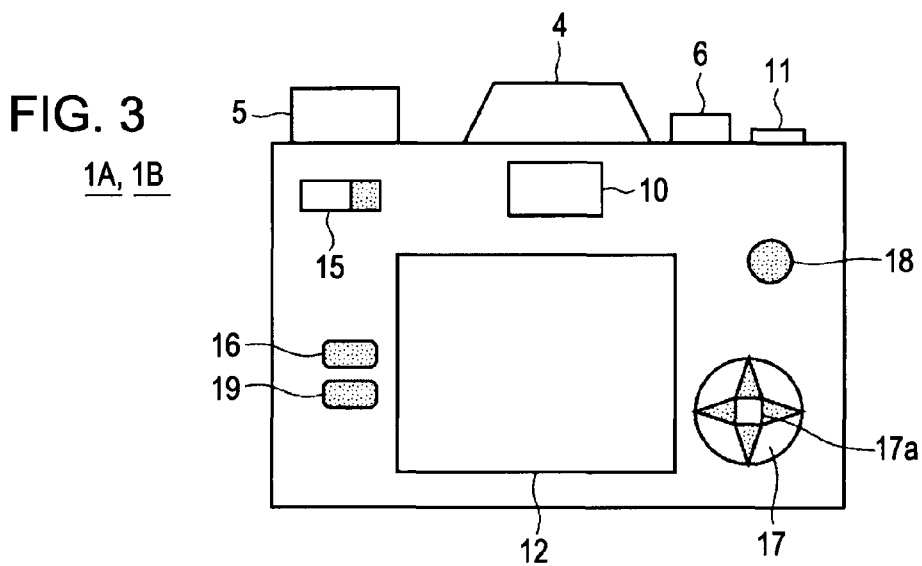
FIG. 3 is a diagram illustrating an outer view of the imaging apparatus according to the first embodiment.

FIGS. 1, 2, and 3 are diagrams illustrating outer views of an imaging apparatus 1A according to the first embodiment of the present invention. Here, FIG. 1 is a front outer view of the imaging apparatus 1A, FIG. 2 is a top outer view of the imaging apparatus 1A, and FIG. 3 is a back outer view of the imaging apparatus 1A.

The imaging apparatus 1A is configured as a digital camera, and has a capture lens 3 on the front surface thereof (refer to FIG. 1).

The capture lens 3 mainly includes a group of lenses, an aperture, etc. The group of lenses includes a focus lens capable of changing a focus position by being moved in an optical axis direction, etc.

Also, the imaging apparatus 1A includes a release button (shutter button) 11 for instructing a start of an exposure, a flash 4, a mode-setting dial 5, and a control-value setting dial 6 on the top surface thereof (refer to FIG. 2).

The release button 11 is a two-step detection button capable of detecting a half-pressed state (S1 state) and a full-pressed state (S2 state). When the release button 11 is half-pressed to go into the half-pressed state, a preparation operation for obtaining a recording still image (actual shot image) on a subject (for example, an automatic focusing (AF) control operation by a phase difference and automatic exposure (AE) control operation, etc.) is performed. Also, when the release button 11 is further pressed to go into the full-pressed state, a shooting operation of an actual capture image is performed (a series of actual shooting operation in which an exposure on a subject image is performed using an imaging device (described later), and the image signal obtained by the exposure is subjected to predetermined image processing).

The mode-setting dial 5 includes a rotatable disc-shaped member. A photographer (also called a "user") can select and validate a desired shooting mode by rotating the mode-setting dial 5.

For example, if the user selects a manual mode (M mode) by rotating the mode-setting dial 5, it becomes possible for the user to manually determine both the shutter speed and the aperture value.

The control-value setting dial 6 includes a rotatable disc-shaped member. The user can set the control values in various shooting modes by rotating the control-value-setting dial 6.

For example, in the manual mode, the user is allowed to freely change the shutter speed to adjust the exposure time (exposure period) by operating the control-value setting dial 6. Also, in the manual mode, the user is allowed to freely change the aperture by operating the control-value-setting dial 6 while pressing a aperture-setting dial 19 on the back surface of the imaging apparatus 1A (refer to FIG. 3).

Also, the imaging apparatus 1A includes a monitor 12, a finder window 10, a main switch (power switch) 15, a menu button 16, and a direction selection key 17 on the back surface (refer to FIG. 3).

More specifically, the monitor 12 is disposed, as a display section, substantially in the center of the back surface of the imaging apparatus 1A. The monitor 12 includes, for example, a liquid crystal color display (LCD). It is possible to display a menu screen for setting shooting conditions, etc., and to playback-display a shot image recorded in a recording device 105, such as a memory card, and the like (refer to FIG. 4) on the monitor 12.

The finder window 10 is disposed on the upper side of the monitor 12. A subject image is led to the finder window 10, and the photographer is allowed to view the subject image and to determine a picture composition by looking into the finder window 10.

The main switch 15 is disposed on the upper left side of the monitor 12. The main switch 15 includes a two-position slide switch. When the contact point is set to the "OFF" position on the left, the power to the imaging apparatus 1A is turned off, and when the contact point is set to the "ON" position on the right, the power to the imaging apparatus 1A is turned on.

A direction selection key (cursor key) 17 and an exposure cancel button 18 are disposed on the right side of the monitor 12. The direction selection key 17 can detect a pressing operation in four directions, up, down, right, and left. In this regard, the direction selection key 17 can also detect a pressing operation of a push button (decision button) 17a in the central part in addition to the pressing operation in the four directions. Also, if the exposure cancel button 18 is operated in a long exposure shot (described later), the exposure is canceled.

The menu button 16 is disposed on the left side of the monitor 12. When the menu button 16 is pressed, the menu screen (setting screen) is displayed on the monitor 12. The user is allowed to perform the setting of detailed operations (for example, AF mode), registration of the shooting conditions, etc., of the imaging apparatus 1A by performing a selection operation or a setting operation (also, simply called a "menu operation") on the menu screen using the direction selection key 17, etc.

1.2 Functions

Figure 4:
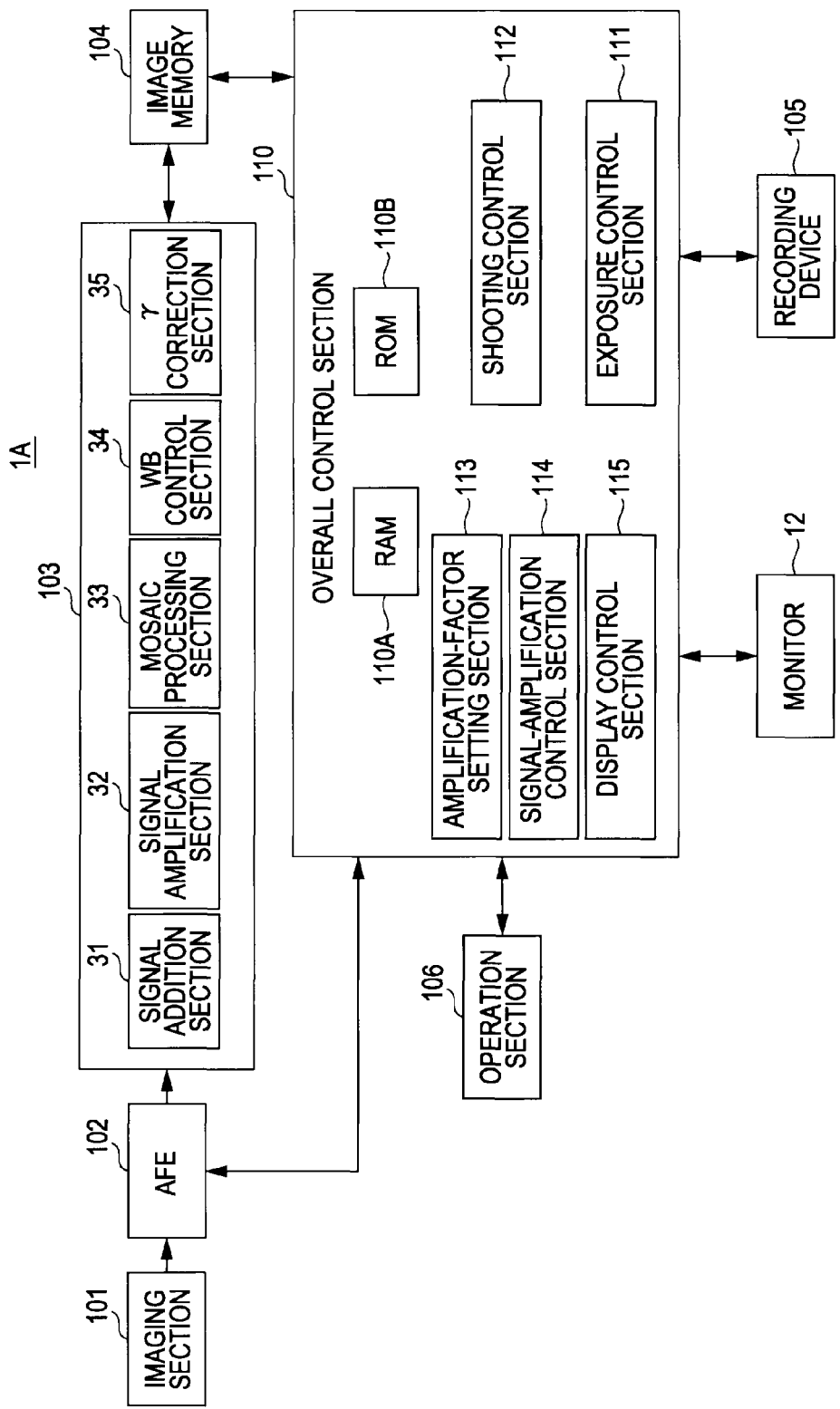
FIG. 4 is a block diagram illustrating a functional configuration of an imaging apparatus according to the first embodiment.

Next, a description will be given of an overview of the functions of the imaging apparatus 1A. FIG. 4 is a block diagram illustrating a functional configuration of the imaging apparatus 1A.

As shown in FIG. 4, the imaging apparatus 1A includes an imaging section 101, an AFE (Analog Front End) 102, an image processing section 103, an image memory 104, a removable recording device 105, an operation section 106, an overall control section 110, etc.

The operation section 106 includes various buttons including the release button 11, the mode-setting button 5, the control-value setting dial 6 (refer to FIG. 1), and the menu button 16 (refer to FIG. 3), switches, etc. The overall control section 110 and the like achieve various operations in response to an input operation by the user to the operation section 106. For example, if the full-pressed state of the release button 11 is detected, a capture operation of an actual shot image is carried out.

The imaging section 101 includes a two-dimensional photoelectric conversion element of an imaging device (CCD, CMOS, etc.) C10 (not shown in the figure), and obtains an image signal of a subject image. A plurality of pixels having a photodiode are arranged in a two-dimensional matrix in a horizontal direction and in a vertical direction on the imaging device C10. On a light acceptance surface of the plurality of pixels, one of original-color transparent filters, namely R (red), G (green), and B (blue) filters, is provided in a Bayer arrangement in a checkered state. Each of the pixels converts a light image of the subject, formed on the pixel, into an analog electronic signal of a corresponding one of the color components, namely R (red), G (green), and B (blue) to generate the image signal.

The AFE 102 gives timing pulses to the imaging device C10 in order for the imaging device C10 to perform a predetermined operation. The AFE 102 has a function of performing predetermined signal processing to convert signals output from individual pixels of the imaging device C10 into digital signals (also called as "digital pixel signals" or "digital image signals"), and outputting the digital signals to the image processing section 103.

The digital signal output to the image processing section 103 is temporarily stored in the image memory 104 in synchronism with the reading of the imaging device C10. The storing of the image into the image memory 104 continues until the reading of the imaging device C10 is completed (until the exposure is completed). After the completion of the exposure, image data has been formed in the image memory 104.

The image processing section 103 accesses the captured image data stored in the image memory 104 to perform predetermined processing, and includes a signal addition section 31, a signal amplification section 32, a mosaic processing section 33, a white-balance (WB) control section 34, a gamma (γ) correction section 35, etc.

The signal addition section 31 adds image signals obtained in sequence by the imaging section 101 in a long exposure shot having a longer exposure time than a reference exposure time BE.

Specifically, in a long exposure shot of the imaging apparatus 1A, the reference exposure time BE is determined to be an exposure time in one exposure (divided exposure), and the exposure is dividedly made for each reference exposure time BE. The signal addition section 31 performs accumulation processing (also simply called "addition processing"), which adds an image signal obtained by each exposure in sequence. The image signal (also called a "sum image signal" or "accumulated image signal") generated by the addition processing is temporarily stored in the image memory 104 as accumulated image data (sum image data), and is used for the addition processing again when the next divided exposure is completed.

The signal amplification section 32 amplifies the sum image signal stored in the image memory 104 at that point in time on the basis of an amplification factor AP set by the overall control section 110 to generate the amplified image signal. Specifically, the signal amplification section 32 individually multiplies the pixel value of each pixel forming the sum image signal by the amplification factor AP to amplify the image signal.

The mosaic processing section 33 obtains a color component of a pixel, which is not held by the pixel, in the captured image data stored in the image memory 104 by interpolation using the color information of the surrounding pixels adjacent to that pixel.

The white-balance control section 34 performs level conversion (white balance (WB) adjustment) of the digital signals of the individual color components, R (red), G (green), and B (blue), on the basis of a white reference in accordance with a light source. Specifically, the white-balance control section 34 identifies a portion which is estimated to be originally white in a shot subject from the luminance, chroma saturation data, etc., on the basis of the WB adjustment data given from the overall control section 110, and obtains the average of the individual color components, R, G, and B, of that portion, the G/R ratio, the G/B ratio, and performs level correction using these as corrected gains of R and B.

The gamma correction section 35 corrects the grayscale characteristic of the image signal having been subjected to the WB adjustment. Specifically, the gamma correction section 35 performs non-linear conversion for each color component of the image signal level using a preset gamma correction table and offset adjustment.

The image memory 104 includes a nonvolatile memory. In the shooting mode, the image memory 104 temporarily stores the image data output from the image processing section 103, and is used as a working area for the overall control section 110 performing predetermined processing on the image signal. Also, in the playback mode, the image memory 104 temporarily stores the image signal read from the recording device 105.

The overall control section 110 is constructed by a microcomputer, and mainly includes a CPU, a RAM 110A, and a ROM 110B. The overall control section 110 reads programs stored in the ROM 110B, and executes the programs on the CPU, thereby achieving various functions. In FIG. 4, an exposure control section 111, a shooting control section 112, an amplification-factor setting section 113, a signal-amplification control section 114, and a display control section 115 represent the functions performed by executing the programs in the overall control section 110 as functional blocks.

The exposure control section 111 performs exposure control adjusting the shutter speed and the aperture value. Specifically, the exposure control section 111 determines an exposure value on the basis of the luminance information of the subject obtained by the imaging device C10, and further sets the shutter speed and the aperture value to have an adequate exposure on the basis of the determined exposure value. In this manner, the imaging apparatus 1A can automatically calculate an exposure time under the control of the exposure control section 111.

That is to say, the imaging apparatus 1A can manually set an exposure time by the operation of the control-value-setting dial 6 and also can obtain an exposure time by the calculation of the exposure control section 111 to automatically set the exposure time.

The shooting control section 112 has a function of controlling various shooting operations in the selected shooting mode.

For example, if an exposure time is preset in a long exposure shot, when the shooting control section 112 detects a full-pressed state of the release button 11, the shooting control section 112 divides the exposure time into the individual reference exposure times BE, and controls to performs a plurality of times of the exposure to the imaging device C10.

The amplification-factor setting section 113 sets the amplification factor AP amplifying the sum image signal in the case of taking a long exposure shot. The amplification factor AP is set by the dial operation of the control-value-setting dial 6. When the control-value-setting dial 6 is operated, the amplification factor AP held in the imaging apparatus 1A is increased or decreased by the amplification-factor setting section 113.

The signal-amplification control section 114 controls the amplification operation of the signal amplification section 32. Specifically, the signal-amplification control section 114 causes the signal amplification section 32 to perform amplification operation amplifying the sum image signal in a predetermined period in the process of the long exposure and generating the amplified image signal.

Here, a description will be given of the case where the above-described predetermined period of performing the amplification operation is a certain period (for example, one minute) starting from the beginning period of the exposure time in the long exposure shot. In this regard, the certain period may be changed by a user's operation using the operation section 106.

The display control section 115 controls the display contents in the display section, such as the monitor 12, etc. For example, the display control section 115 displays an image on the basis of the image signal stored in the image memory 104 in the shooting mode. Also, in particular, in a long exposure shot, in the above-described predetermined period, that is to say, in a certain period from the beginning of the long exposure, an image based on the amplified image signal (also called "amplified image") is displayed on the monitor 12. And in the period other than the above-described predetermined period in the long exposure, an image based on the sum image signal (also called a "sum image") is displayed on the monitor 12 as a captured image during exposure.

In this manner, in a certain period from the beginning of the long exposure, an amplified image signal is generated by the amplification operation, and a series of amplification and display operation, in which an image based on the amplified image signal is displayed on the monitor 12, is performed. Accordingly, the period is also expressed as an amplification period (also called an "amplified display period" or an "amplified image display period"). Also, in the period other than the amplified display period, an image based on the sum image signal is displayed on the monitor 12. Accordingly, the other period is expressed as a sum-image display period (also called a "captured image display period").

1.3 About Long Exposure Shot

Figure 5:
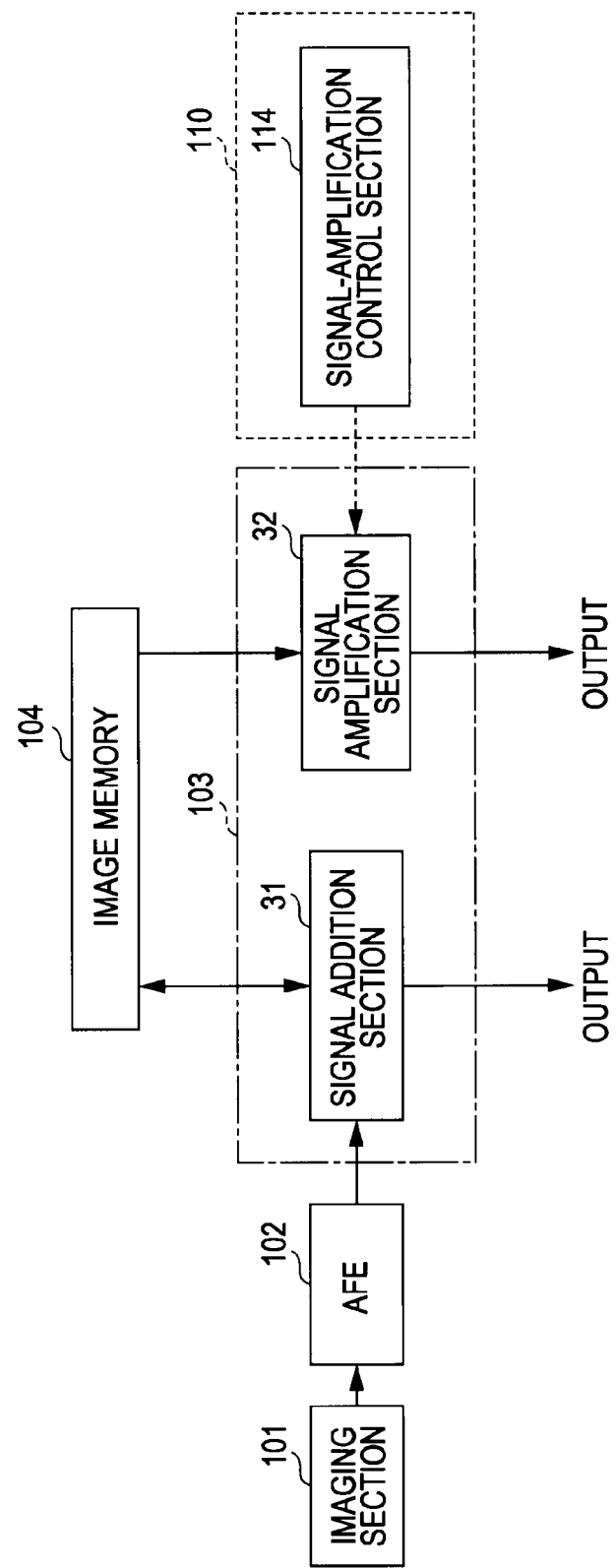
FIG. 5 is a diagram illustrating main functional sections in a long exposure shot.
Figure 6:
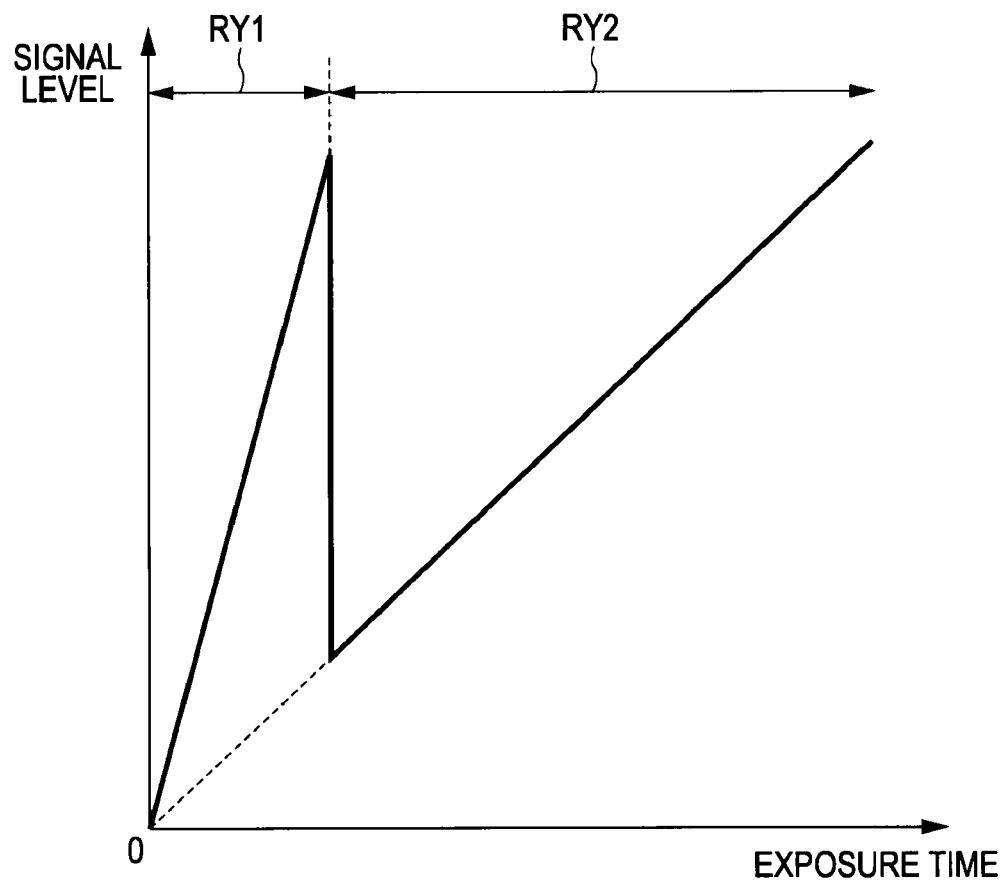
FIG. 6 is a diagram illustrating a signal level of a predetermined pixel in an image displayed on a monitor.

Here, a detailed description will be given of a long exposure shot in the imaging apparatus 1A. FIG. 5 is a diagram illustrating main functional sections in a long exposure time shot. FIG. 6 is a diagram illustrating a signal level of a predetermined pixel in an image displayed on the monitor 12.

In a long exposure shot in the imaging apparatus 1A, the exposure to the imaging device C10 is divided into a plurality of times to be performed, and the image signals obtained by individual divided exposures are added in sequence.

In the amplified display period, the image based on the amplified image signal having been subjected the amplification by the signal amplification section 32 is displayed on the monitor 12 of the imaging apparatus 1A.

Specifically, as shown in FIG. 5, the signal addition section 31 receives the input of the image signals generated by the imaging section 101 and the AFE 102 in the individual divided exposures in sequence in response to the timing pulses of the AFE 102.

The signal addition section 31 reads the sum image signal stored in the image memory 104, and adds the newly input image signal to the sum image signal. The sum image signal newly generated by the addition processing is saved into the image memory 104 as accumulated image data. Also, in the sum-image display period, the image based on the newly generated sum image signal is displayed on the monitor 12. In this regard, the image signal obtained by the first exposure in the long exposure shot is directly saved in the image memory 104 as the accumulated image data.

The signal amplification section 32 receives an instruction signal (amplification instruction signal) of executing an amplification operation from the signal-amplification control section 114, and performs the amplification operation. The amplification operation is performed using the amplification factor AP set by the amplification-factor setting section 113. Specifically, the current sum image signal is read from the image memory 104, the sum image signal is amplified by the amplification factor AP to generate an amplified image signal. And, the image based on the generated amplified image signal is displayed on the monitor 12.

In this manner, in the imaging apparatus 1A, the image based on the amplified image signal is displayed on the monitor 12 in the amplified display period, and the image based on the sum image signal is displayed on the monitor 12 in the sum-image display period different from the amplified display period.

For example, if the amplification factor AP is set to four, the image based on the amplified image signal four times the sum image signal is displayed on the monitor 12 in the amplified display period (the period indicated by a bi-directional arrow RY1 in FIG. 6). And the image based on the sum image signal is displayed on the monitor 12 in the sum-image display period (the period indicated by a bi-directional arrow RY2 in FIG. 6) after the amplified display period.

In this manner, in the imaging apparatus 1A, at a point in time soon after the beginning of the exposure, the amplified shot image is displayed, and thus it is possible to view a relatively light image from the beginning of the exposure. Accordingly, when shooting a subject having a low luminance in a long exposure shot, the user is allowed to view a relatively light image from the beginning of the exposure, and thus it becomes possible for the user to determine whether a picture composition is adequate or not in the early stage from the beginning of the exposure.

Also, in the imaging apparatus 1A, when the exposure progresses, the amplification of the image signal is terminated, and the image is displayed on the basis of the sum image signal at the current point in time.

By this means, the user is allowed to check the actual amount of exposure at the current point in time by viewing the displayed image, and thus it becomes possible to perform exposure determination, that is to say, whether the amount of exposure is adequate or not.

If the user has determined that the picture composition is inadequate, the user can instruct the imaging apparatus 1A to cancel the exposure by the pressing operation of the exposure cancel button 18.

Also, if the user has determined that the amount of exposure is adequate, the user can instruct the imaging apparatus 1A to terminate the exposure by pressing the release button 11 again.

When the imaging apparatus 1A detects the full-pressed state of the release button 11 again during the exposure, the imaging apparatus 1A executes the exposure termination operation, and stores the sum image signal saved in the image memory 104 at the current point in time into the recording device 105 as a shot image obtained by the long exposure shot (also, called a "long exposure image").

1.4 Operation

Figure 7:
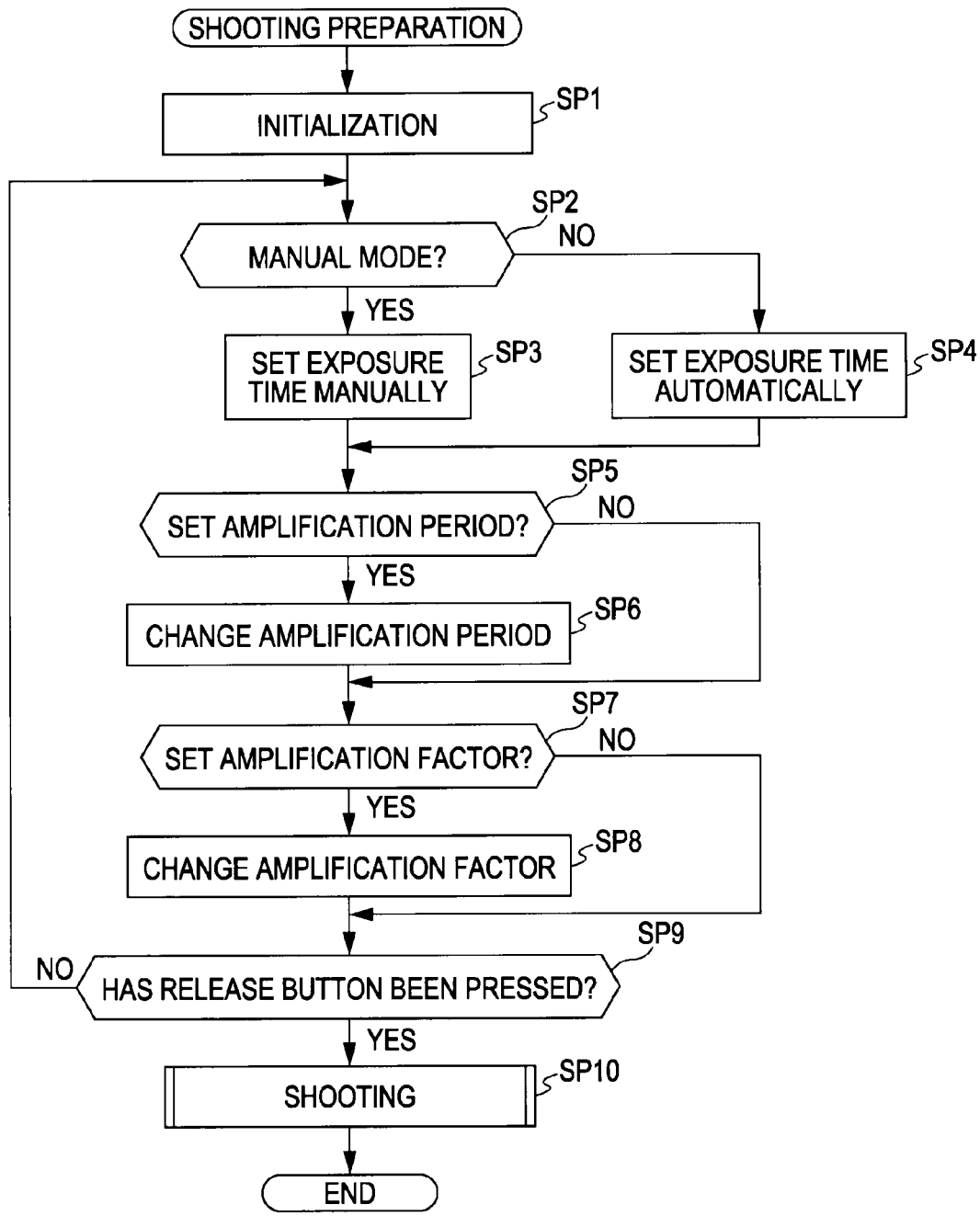
FIG. 7 is a flowchart illustrating a shooting operation of the imaging apparatus.

Next, a description will be given of a shooting operation of the imaging apparatus 1A. FIG. 7 is a flowchart illustrating a shooting operation of the imaging apparatus 1A.

As shown in FIG. 7, first, in step SP1, when the shooting mode is detected, the initialization of the imaging apparatus 1A, such as the initialization of the imaging device C10, the returning the focus lens to the initialization position, the initialization of the variables and flags to be used for calculation, and the like, are performed.

In step SP2, the state of the mode setting dial 5 is detected, and a determination is made on whether the dial is set to the manual mode or not.

When the dial is set to the manual mode, the processing proceeds to step SP3. In step SP3, an exposure time TE is set by the user's operation of the control-value-setting dial 6. On the other hand, if the dial is not set to the manual mode, the processing proceeds to step SP4. In step SP4, the exposure control section 111 automatically sets an exposure time TE so as to have an adequate exposure.

In step SP5, a determination is made on whether an amplification period is set by the operation of the control-value-setting dial 6, etc.

If the amplification period is set, the processing proceeds to step SP6, and the value of the amplification period held in the imaging apparatus 1A is changed in accordance with the operation of the control-value-setting dial 6. On the other hand, if the amplification period is not set, the processing proceeds to step SP7.

In step SP7, a determination is made on whether the amplification factor AP is set by the operation of the control-value-setting dial 6, etc.

When the amplification factor AP is set, the processing proceeds to step SP8, and the value of the amplification factor AP held in the imaging apparatus 1A is changed in accordance with the operation of the control-value-setting dial 6. On the other hand, when the amplification factor AP is not set, the processing proceeds to step SP9.

In step SP9, a determination is made on the start of shooting on the basis of the pressed state of the release button 11. Specifically, if the full-pressed state (the S2 state) of the release button 11 is not detected, the processing proceeds to step SP2, and the processing from step SP2 to step SP9 is repeated until the full-pressed state of the release button 11 is detected. On the other hand, if the full-pressed state (the S2 state) of the release button 11 is detected, the processing proceeds to step SP10.

In step SP10, an actual shooting operation is started. Specifically, subject light enters onto the imaging device C10, and each pixel included in the imaging device C10 generates a pixel signal.

Figure 8:
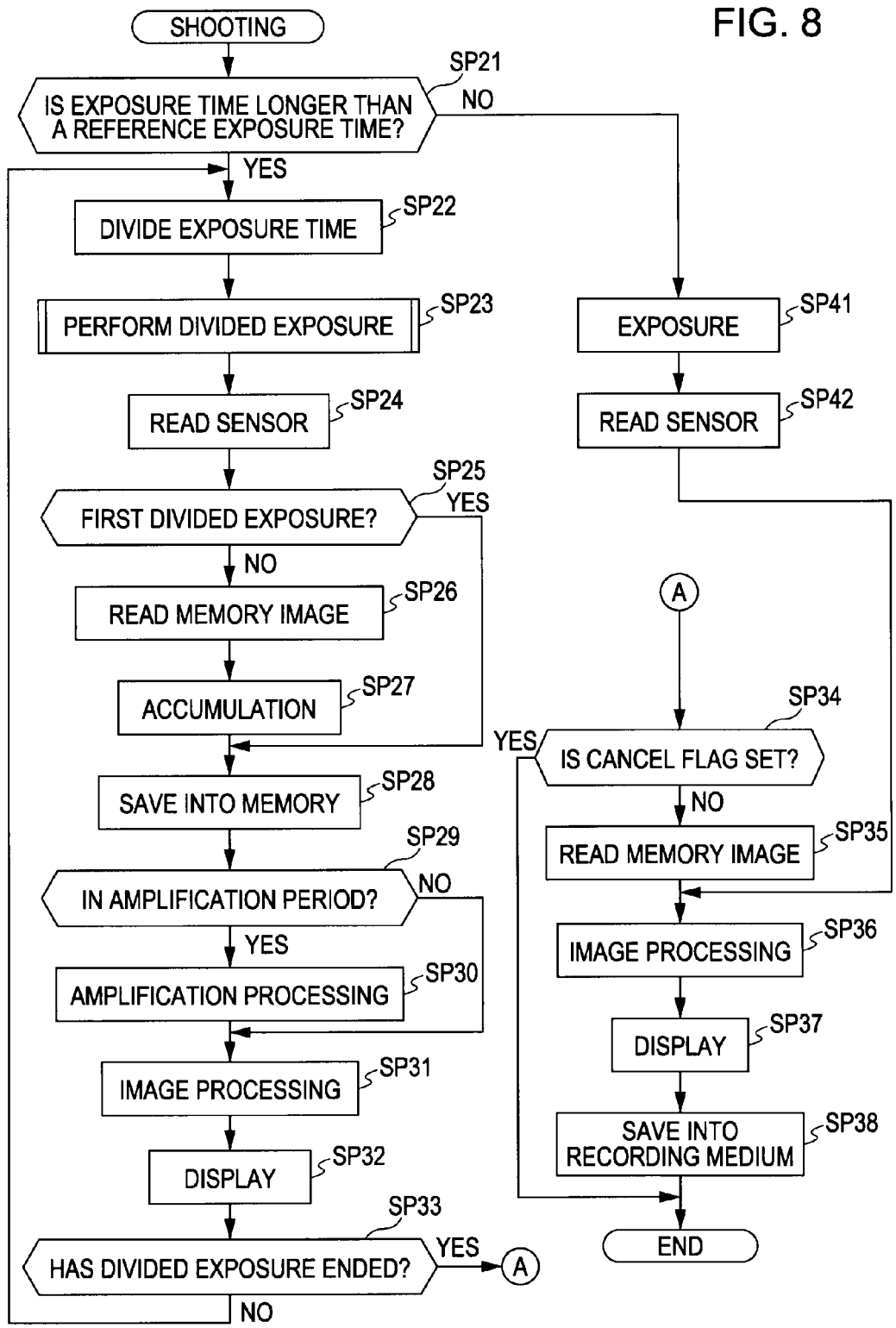
FIG. 8 is a flowchart illustrating an actual shooting operation.

Here, a detailed description will be given of the actual shooting operation performed in step SP10. FIG. 8 is a flowchart illustrating the actual shooting operation.

When the full-pressed state of the release button 11 is detected (step SP9), the actual shooting operation shown in FIG. 8 is started.

In step SP21, the shooting control section 112 determines whether the exposure time (also called the "set exposure time") set manually or automatically set by the exposure control section 111 is longer than the reference exposure time BE.

If the exposure time TE is shorter than the reference exposure time BE, the processing proceeds to step SP41, and shooting with a normal exposure is made. Specifically, an exposure is made by the set exposure time TE (step SP41), the image signal obtained at that exposure is read from the imaging device C10 to obtain the actual shot image (step SP42), and then the processing proceeds to step SP36.

On the other hand, if the exposure time TE is longer than the reference exposure time BE, the processing proceeds to step SP22, and shooting with divided exposures is carried out in a series of processes of step SP22 and after that.

In the following, a description will be given of shooting by divided exposures when the reference exposure time BE is assumed to be, for example, one minute.

In step SP22, the division processing of the exposure time TE is performed. Specifically, the exposure time TE is divided by the reference exposure time BE to determine the number of times of the divided exposures (the number of exposures). Also, if a fraction arises when the exposure time TE is divided by the reference exposure time BE, the exposure for the fraction is made at the time of making the last divided exposure. That is to say, the exposure time for the fraction is added to the exposure time of the last divided exposure.

In step SP23, the divided exposure for one time is made. A detailed description will be given later.

In step SP24, the image signal obtained by the imaging device C10 in the divided exposure for the one time is read.

In step SP25, a determination is made on whether the divided exposure made in step SP23 is the first divided exposure or not.

If it is the first divided exposure, steps SP26 and SP27 are omitted, and the processing proceeds to step SP28, and the image signal is saved into the image memory 104.

On the other hand, if it is not the first divided exposure, the processing proceeds to step SP26. In step SP26, the sum image signal stored in the image memory 104 is read.

In step SP27, the signal addition section 31 performs addition processing adding the image signal obtained by the divided exposure to the sum image signal.

In step SP28, the sum image signal newly produced by the addition processing is saved into the image memory 104.

In step SP29, a determination is made on whether it is in an amplification period on the basis of the accumulated time of exposures made until the current time (also, called an "accumulated exposure time"). If determined that it is in the amplification period, the processing proceeds to step SP30.

In step SP30, the sum image signal is read from the image memory 104, and the signal amplification section 32 performs the amplification processing of the sum image signal using the amplification factor AP.

On the other hand, if determined that it is not in the amplification period in step SP29, the processing proceeds to step SP31.

In step SP31, the image processing section 103 performs predetermined image processing, such as gamma correction, etc., on the amplified image signal or the sum image signal. Specifically, the predetermined image processing is performed on the amplified image signal in the amplified image display period, and the predetermined image processing is performed on the sum image signal in the sum-image display period.

In step SP32, the display control section 115 displays the image based on the sum image signal or the image based on the amplified image signal on the monitor 12. Specifically, the image based on the amplified image signal is displayed on the monitor 12 in the amplified-image signal display period, and the image based on the sum image signal is displayed on the monitor 12 in the sum-image display period.

In step SP33, a determination is made on whether the divided exposures for the number of times determined in step SP22 has ended.

Specifically, if it is determined that the divided exposures for the determined number of times have not ended, the processing proceeds to step SP22, and the processing of step SP22 to SP33 is repeated.

On the other hand, if the divided exposures for the determined number of times have all ended, the processing proceeds to step SP34.

In step SP34, a determination is made on whether a cancel flag indicating the cancellation of exposure is set. If the cancel flag is set, the actual shooting operation is terminated without performing the processing of steps SP35 to SP38.

On the other hand, if the cancel flag is not set, the processing proceeds to step SP35.

In step SP35, the latest sum image signal stored in the image memory 104 at the end of the exposure is read, and a long exposure image is obtained as the actual shot image.

After that, the same predetermined image processing as that in step SP31 is performed on the actual shot image (step SP36), and the actual shot image after having been subjected to the above-described predetermined image processing is displayed on the monitor 12 (step SP37).

In step SP38, the actual shot image is saved into the recording device 105, and the actual shooting operation is terminated.

In this manner, in the actual shooting operation, in the case of a long exposure shot, the exposure is divided, and the image signals obtained from individual exposures are added to generate a sum image signal. And, the sum image signal is amplified in the amplified display period during the exposure in the long exposure shot, and the image based on the amplified image signal is displayed on the monitor 12. When the amplified display period has passed, the image based on the sum image signal is displayed on the monitor 12.

Figure 9:
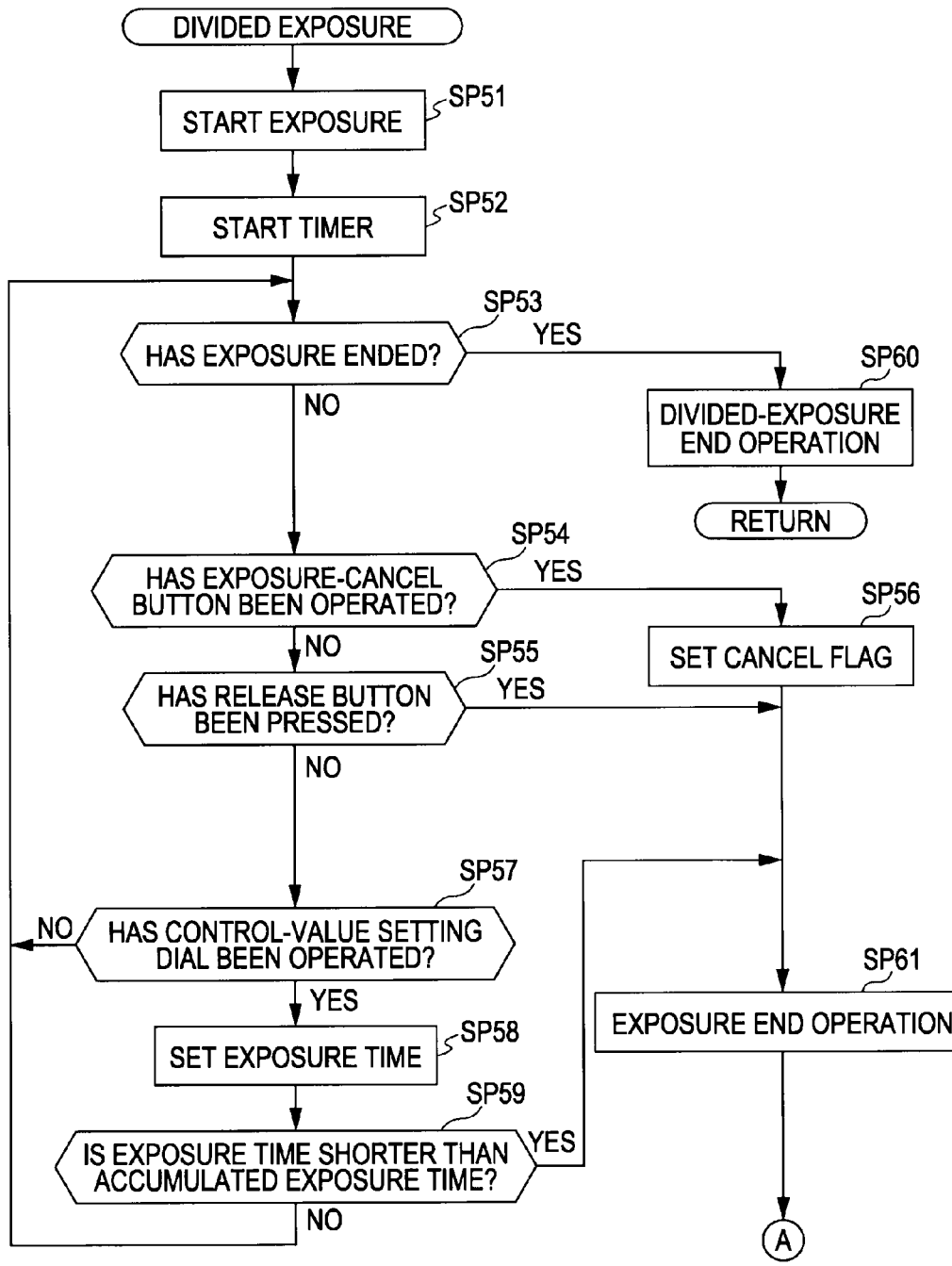
FIG. 9 is a detailed flowchart illustrating a divided exposure operation.

In the following, a detailed description will be given of the divided exposure operation performed in step SP23. FIG. 9 is a flowchart illustrating the detailed divided exposure operation.

As shown in FIG. 9, first, in step SP51, the shooting control section 112 sends a control signal indicating the start of exposure to the imaging device C10, and the exposure is started.

In step SP52, a timer for counting the exposure time is started at the same time with the beginning of the exposure.

In step SP53, the measured time by the timer is checked, and a determination is made on whether the reference exposure time BE (here, one minute) has passed, that is to say, whether the divided exposure for one time has ended.

If the measured time by the timer is over (greater than) the reference exposure time BE, the processing proceeds to step SP60, and the end operation of the exposure is performed. Specifically, in step SP60, a control signal indicating the end of the exposure is sent to the imaging device C10, and the timer is reset. When the exposure has ended, the processing proceeds to step SP24 (FIG. 8).

On the other hand, if the measured time by the timer is not over (less than) the reference exposure time BE, the processing proceeds to step SP54.

In step SP54, a determination is made on whether the exposure cancel button 18 has been operated. If the exposure cancel button 18 has been operated, the processing proceeds to step SP56, the cancel flag is set, and then the end operation of the exposure is performed in step SP61.

In this manner, in the imaging apparatus 1A, if the picture composition is unsatisfactory, or the like after the start of a long exposure shot, it is possible to cancel the exposure by the operation of the exposure cancel button 18.

On the other hand, if the exposure cancel button 18 has not been operated, the processing proceeds to step SP55.

In step SP55, a determination is made on whether the release button 11 has been operated.

If the full-pressed state of the release button 11 is detected, the processing proceeds to step SP61, and the end operation of the exposure is performed. After the end operation of the exposure has been performed, the processing proceeds to step SP34 (FIG. 8).

In this manner, if the release button 11 is pressed again, the end instruction of the exposure is operated in the imaging apparatus 1A. Thus, the user is allowed to end the exposure operation by pressing the release button 11 again.

On the other hand, if the full-pressed state of the release button 11 is not detected, the processing proceeds to step SP57.

In step SP57, a determination is made on whether the exposure time TE has been changed by the dial operation of the control-value-setting dial 6.

If the dial operation of the control-value-setting dial 6 has not been detected, the processing returns to step SP53. If the dial operation of the control-value-setting dial 6 has been detected, the processing proceeds to step SP58.

In step SP58, the exposure time TE is changed in accordance with the dial operation of the control-value-setting dial 6.

In step SP59, a determination is made on whether the changed exposure time is shorter than an accumulated exposure time DT.

If the changed exposure time is shorter than the accumulated exposure time DT, the processing proceeds to step SP61, the exposure end operation is performed, and then the processing proceeds to step SP34 (FIG. 8).

On the other hand, if the changed exposure time is longer than the accumulated exposure time DT (if the accumulated exposure time DT has not passed the changed exposure time), the processing returns to step SP53.

In this manner, if the user determines that the image is too light or too dark by viewing the image displayed on the monitor 12, the user is allowed to change the exposure time. If the exposure time is changed, the shooting control section 112 performs the exposure end operation, or setting the number of times of exposure again (step SP22), etc., after the divided exposure currently in execution is completed.

As described above, in the imaging apparatus 1A, the exposure to the imaging device is divided into a plurality of times of exposures, and image signals obtained by individual exposures are added in sequence to generate a sum image signal. In the amplified-image signal display period during the exposure period, the amplified image signal is generated using the amplification factor AP, and the amplified image based on the amplified image signal is displayed on the monitor 12. Also, in the period other than the amplified-image signal display period, the image based on the sum image signal is displayed on the monitor 12.

By this means, the user is allowed to view a relatively light image in the amplified display period during the exposure period, and thus it becomes possible for the user to determine whether a picture composition is adequate or not. Also, in the period other than the amplified display period during the exposure period, the user is allowed to check the actual amount of exposure at the current point in time by viewing the displayed image, and thus it becomes possible to perform exposure determination, namely, whether the amount of exposure is adequate or not.

1.5 Setting Amplification Period

As described above, in a long exposure shot of the imaging apparatus 1A, in the amplified-image signal display period, which is a predetermined period from the beginning of the exposure, the image based on the amplified-image signal is displayed.

Up to now, a method has been employed of determining the end period of the amplified display period, PT1, as a certain period predetermined before shooting. However, the present invention is not limited to this, and the end period of the amplified display period can be determined by individual methods PT2 to PT5 shown in FIG. 10, for example.

PT2 (Determine end period in accordance with the shooting sensitivity of the imaging device C10):

The exposure time changes in accordance with the sensitivity (also called imaging sensitivity) of the imaging device C10 that has been set, and thus the end period of the amplified display period may be changed in accordance with the imaging sensitivity.

In a digital camera including an imaging device, the imaging sensitivity is changed by changing the output of the imaging device. For example, if a sensitivity specific to an imaging device is assumed to be a minimum sensitivity, a sensitivity higher than the minimum sensitivity is achieved by amplifying the output of the imaging device. More particularly, if the sensitivity specific to an imaging device corresponds to the ISO sensitivity 100, the ISO sensitivity 200 can be achieved by amplifying the output of the imaging device by two times. The ISO sensitivity 400 can be achieved by amplifying the output of the imaging device by four times.

A change in the output of the imaging device caused by such a change in the sensitivity has an influence on the exposure time. If the sensitivity is high, the output of the imaging device is amplified, and thus the exposure time becomes short, whereas if the sensitivity is low, the exposure time becomes long. For example, a subject which necessitates exposure of ten minutes at ISO sensitivity 100 can be shot with exposure of five minutes at ISO sensitivity 200, and can be shot with exposure of two minutes 30 seconds at ISO sensitivity 400.

Accordingly, if the amplified display period is changed in connection with the ISO sensitivity, it is possible to ensure the amplified display period in accordance with a shooting scene. More particularly, the above is possible if the amplified display period is shortened in accordance with an increase in the shooting sensitivity, and the amplified display period is extended in accordance with a decrease in the shooting sensitivity.

For example, in the case where the amplified display period is set to one minute at ISO sensitivity 100, if the ISO sensitivity is changed to ISO sensitivity 200, the amplified display period is changed to 30 seconds, and if the ISO sensitivity is changed to ISO sensitivity 400, the amplified display period is changed to 15 seconds.

In this manner, if the end period of the amplified display period is changed in accordance with the ISO sensitivity, it becomes possible to set the amplified display period that matches a shooting scene.

In this regard, in the case where the amplified display period is calculated in accordance with a change in the ISO sensitivity, if the amplified display period is too short (for example, if the period is five seconds or less), a minimum amplified display period (for example, five seconds) may be ensured without using the calculated amplified display period.

PT3 (Determine end period so that the period is a predetermined percentage of set exposure time): The amplified display period may be determined such that the amplified display period is a predetermined percentage (for example, ten percent) of the exposure time set by the user.

By this, if the set exposure time is long, the amplified display period becomes long, whereas if the set exposure time is short, the amplified display period becomes short. That is to say, the length of the amplified display period is changed in accordance with the length of the exposure time, and thus it becomes possible to ensure the amplified display period in accordance with a shooting scene.

PT4 (Determine end period so that the period is a predetermined percentage of calculated exposure time):

The end period of the amplified display period may be determined such that the amplified display period is a predetermined percentage (for example, ten percent) of the theoretical exposure time calculated the by the exposure control section 111.

By this means, it becomes possible to ensure the amplified display period suitable for a shooting scene even in the case where the reliability of the exposure time set by the user is low.

PT5 (Determine that end period is to be a point in time when the signal level of the amplified image signal is saturated):

The pixel value of each pixel forming a shot image has an upper limit value (for example, 255 in the case of 8 bits). Thus, the end period of the amplified display period may be determined to be a point in time when the saturation of the signal level of the amplified image signal is detected.

More particularly, the end period of the amplified display period may be determined to be a point in time when a pixel value has reached an upper limit in any one of pixels out of the individual pixels forming the amplified shot image.

In this manner, if the end period of the amplified display period is determined on the basis of whether the signal level of a predetermined pixel in the amplified image is saturated or not, it is possible to avoid performing useless amplification after the pixel value has reached the upper limit value, and the signal level has been saturated.

Also, the end period of the amplified display period may be determined to be a point in time when the number of pixels having reached at an upper limit value is over a predetermined value in the individual pixels forming the amplified image.

In this manner, if the end period of the amplified display period is determined on the basis of whether the signal levels of a plurality of pixels have been saturated, it is possible to continue the amplified display period until the signal levels are saturated in a relatively wide range in the shot image. By this means, for example, in the case of shooting a subject a part of which is illuminated by the influence of light, etc., it is possible to prevent the amplified display period from being shortened under the influence of that illuminated part.

Also, it may be possible to switch the criterion from the determination of whether the signal level of a predetermined pixel has been saturated to the determination of whether the signal levels of a plurality of pixels have been saturated by the user operation using a button, etc., included in the operation section 106.

Specifically, either one is validated from the function of detecting the saturation of the signal level of a predetermined pixel and the function of detecting the saturation of the signal levels of a plurality of pixels. If the function of detecting the saturation of the signal level of a predetermined pixel is validated, the end period of the amplified display period is determined to be a point in time when the signal level of a predetermined pixel is saturated. Also, if the function of detecting the saturation of signal levels of a plurality of pixels is validated, the end period of the amplified display period is determined to be a point in time when the saturation of the signal levels of a plurality of pixels is detected.

In this manner, if the determination is made by switching between on a single-pixel basis to a plurality of pixel basis, it becomes possible to select a method of determining the optimum amplified display period in accordance with a shooting scene.

2. Second Embodiment

Next, a description will be given of a second embodiment of the present invention.

Figure 11:
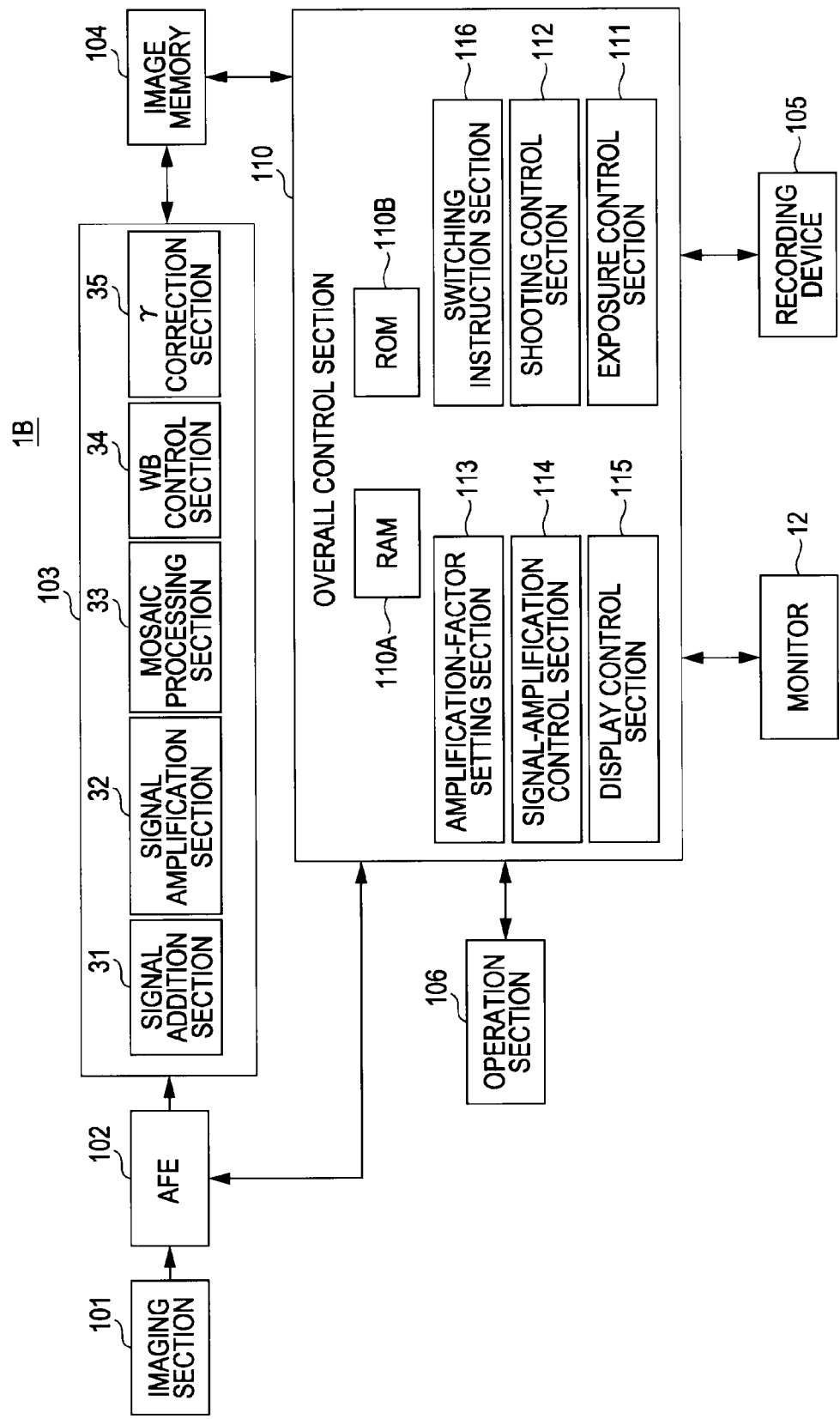
FIG. 11 is a block diagram illustrating a functional configuration of an imaging apparatus according to a second embodiment.

In the imaging apparatus 1A according to the first embodiment, the amplified display period is determined to be a predetermined period from the start of exposure in a long exposure shot, and the amplified display operation is performed. However, in an imaging apparatus 1B according to the second embodiment, the amplified display operation is performed in any period in an exposure period. FIG. 11 is a block diagram illustrating a functional configuration of the imaging apparatus 1B.

In this regard, the imaging apparatus 1B has the same configuration and functions (refer to FIGS. 1 to 3) as those of the imaging apparatus 1A according to the first embodiment except that the imaging apparatus 1B includes a switching instruction section 116 giving an instruction to switch execution/non-execution of the amplified display operation.

As shown in FIG. 11, the imaging apparatus 1B has the switching instruction section 116 giving an instruction to switch execution/non-execution of the amplified display operation in a long exposure shot.

The display control section 115 alternatively displays, on the monitor 12, the amplified image and the sum image in response to the switching instruction from the switching instruction section 116.

In this regard, the switching instruction may be given by detecting a user's operation using an input means, such as a button included in the operation section 106, etc.

By this means, it becomes possible for the user to view the amplified shot image or a shot image in the process of being exposed, and thus the convenience of the imaging apparatus 1B is improved.

Also, the switching instruction may be automatically given at predetermined time intervals by the switching instruction section 116.

By this means, it becomes possible for the user to automatically view the amplified image and the shot image during exposure alternately without the user's operation, and thus the user can check a picture composition and determine exposure at any timing.

3. Variations

The descriptions have been given of the embodiments of the present invention. However, the present invention is not limited to the contents described above.

Figure 12:
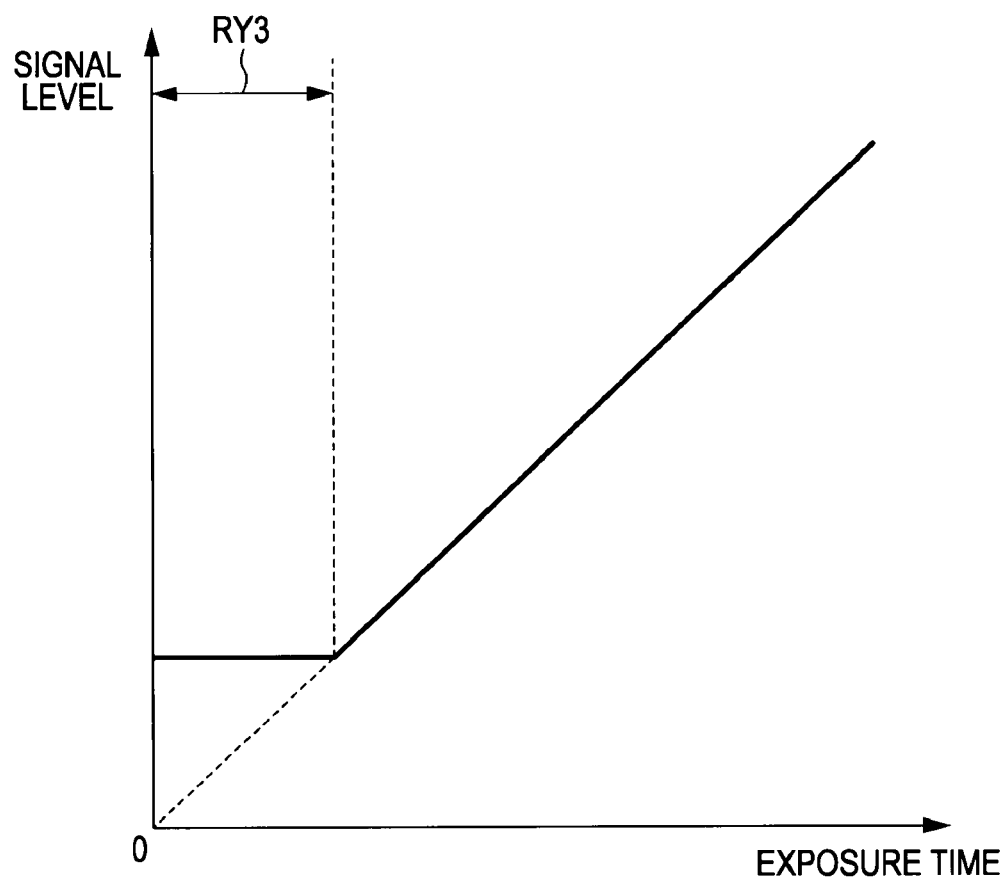
FIG. 12 is a diagram illustrating a signal level of a predetermined pixel in an image displayed on a monitor.

For example, in the above-described embodiments, the amplification factor AP is set to be a constant multiple (for example, four times). However, the present invention is not limited to this. FIG. 12 is a diagram illustrating a signal level of a predetermined pixel in an image displayed on the monitor 12.

Specifically, the amplification-factor setting section 113 may set the amplification factor AP such that the signal level becomes constant for each pixel in the amplified image.

The amplification factor AP that makes the signal level constant is expressed, for example, by Expression 1 using the length ML of the amplified display period and the accumulated exposure time DT.

[Expression 1]

$$AP = ML/DT \quad (1)$$

The amplification factor AP expressed by Expression 1 represents the ratio of the length ML of the amplified display period to the accumulated exposure time DT.

When the sum image signal is amplified using the above-described amplification factor AP, the signal level of the pixel in the amplified image becomes constant in the amplified display period (for example, a period shown by a bi-directional arrow RY3 in FIG. 12).

Also, if the amplification factor AP expressed by Expression 1 is used, an image having the same brightness as that of the sum image obtained in the end period of the amplified display period is generated, and thus the user can view the bright image from the start of the exposure.

In this manner, it is possible to check whether the picture composition is good or not immediately after the start of the exposure by enabling the user to view an image having the same brightness as that of the sum image obtained in the end period of the amplified display period from the start of the exposure.

Also, in the above-described embodiments, the luminance information of a subject, used at the time of determining the exposure value, is obtained from the imaging device C10. However, the present invention is not limited to this.

Specifically, the imaging apparatuses 1A and 1B may be provided with a new photometric element, and the luminance information of a subject may be obtained from the photometric element.

Also, in the above-described first embodiment, an example of the operation of the imaging apparatus 1A has been described in a long exposure shot when the exposure time is preset. However, the present invention is not limited to this.

Specifically, in bulb shooing, in which an exposure is made while the release button 11 is pressed, the exposure may be divided into a predetermined time periods, and the amplified display operation may be performed with a predetermined period from the start of the bulb shooting as an amplified display period.

In this regard, the amplified display period in bulb shooting ought to be a predetermined percentage of the theoretical exposure time calculated by the exposure control section 111, for example.

The present application contains subject matter related to that disclosed in Japanese Priority Patent Application JP 2008-247580 filed in the Japan Patent Office on Sep. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an imaging device generating an image signal on a subject image;
a shooting control means for dividing an exposure to be made to the imaging device in an exposure period into a plurality of times of exposures;
an adding means for adding individual image signals obtained by the plurality of divided exposures in sequence to generate a sum image signal;
an amplification control means for amplifying the sum image signal using a predetermined amplification factor in a first period in the exposure period to generate an amplified image signal; and
a display control means for displaying, on a display section, the amplified image based on the amplified image signal in the first period, and displaying, on a display section, an image based on the sum image signal in a period other than the first period in the exposure period, wherein the amplified image and the sum image signal are both displayed within the same exposure period.

2. The imaging apparatus according to claim 1, wherein the first period is started from a start period of the exposure period.

3. The imaging apparatus according to claim 2, further comprising a calculation means for calculating the exposure period,
wherein the first period is a predetermined percentage of the exposure period calculated by the calculation means.

4. The imaging apparatus according to claim 2, wherein the first period is a predetermined percentage of the exposure period set by a user.

5. The imaging apparatus according to claim 2, wherein the first period is a preset certain period of time.

6. The imaging apparatus according to claim 2, wherein the first period is changed in accordance with an imaging sensitivity of the imaging device.

7. The imaging apparatus according to claim 2, further comprising a detection means for detecting whether a signal level of the amplified image signal has been saturated,
wherein an end period of the first period is determined to be a point in time when the detection means has detected saturation of the signal level.

8. The imaging apparatus according to claim 7, wherein the detection means detects whether a signal level of a predetermined pixel in the amplified image has been saturated, and
an end period of the first period is determined to be a point in time when saturation of the signal level of the predetermined pixel has been detected.

9. The imaging apparatus according to claim 7, wherein the detection means detects whether signal levels of a plurality of pixels in the amplified image have been saturated, and
an end period of the first period is determined to be a point in time when saturation of the signal levels of the plurality of pixels has been detected.

10. The imaging apparatus according to claim 2, further comprising:
a first detection means for detecting whether a signal level of a predetermined pixel in the amplified image has been saturated;
a second detection means for detecting whether signal levels of a plurality of pixels in the amplified image have been saturated; and
a validation means for validating either of the first detection means and the second detection means in accordance with a user's operation,
wherein when the first detection means is validated by the validation means, an end period of the first period is determined to be a point in time when saturation of the signal level of the predetermined pixel has been detected, and
when the second detection means is validated by the validation means, an end period of the first period is determined to be a point in time when saturation of the signal levels of the plurality of pixels has been detected.

11. An imaging apparatus comprising:
an imaging device generating an image signal on a subject image;
a shooting control means for dividing an exposure period to the imaging device into a plurality of times of exposures;
an adding means for adding individual image signals obtained by the plurality of divided exposures in sequence to generate a sum image signal;
an amplification means for amplifying the sum image signal using a predetermined amplification factor to generate an amplified image signal; and
a display control means for alternatively displaying, on a display section, an amplified image based on the amplified image signal and a sum image based on the sum image signal in accordance with a switching instruction, wherein the amplified image and the sum image signal are both displayed within the same exposure period.

12. The imaging apparatus according to claim 11, further comprising an input means for inputting the switching instruction by a user,
wherein the display control means controls the displaying on the display section in accordance with the switching instruction by the user.

13. The imaging apparatus according to claim 11, further comprising a switching instruction means for giving the switching instruction at predetermined time intervals,
wherein the display control means controls the displaying on the display section in accordance with the switching instruction by the switching instruction means.

14. A method of controlling an imaging apparatus, the method comprising the steps of:
dividing an exposure to be made to an imaging device in an exposure period into a plurality of times of exposures;
adding individual image signals obtained by the plurality of divided exposures in sequence to generate a sum image signal;
amplifying the sum image signal using a predetermined amplification factor in a first period in the exposure period to generate an amplified image signal; and
displaying, on a display section, the amplified image based on the amplified image signal in the first period, and displaying, on a display section, an image based on the sum image signal in a period other than the first period in the exposure period, wherein the amplified image and the sum image signal are both displayed within the same exposure period.

15. A non-transitory computer readable medium storing a program for causing a computer including an imaging apparatus to perform processing comprising the steps of:
dividing an exposure to be made to an imaging device in an exposure period into a plurality of times of exposures;
adding individual image signals obtained by the plurality of divided exposures in sequence to generate a sum image signal;
amplifying the sum image signal using a predetermined amplification factor in a first period in the exposure period to generate an amplified image signal; and
displaying, on a display section, the amplified image based on the amplified image signal in the first period, and displaying, on a display section, an image based on the sum image signal in a period other than the first period in the exposure period, wherein the amplified image and the sum image signal are both displayed within the same exposure period.

16. A method of controlling an imaging apparatus, the method comprising the steps of:
dividing an exposure period to the imaging device into a plurality of times of exposures;
adding individual image signals obtained by the plurality of divided exposures in sequence to generate a sum image signal;
amplifying the sum image signal using a predetermined amplification factor to generate an amplified image signal; and
alternatively displaying an amplified image based on the amplified image signal and a sum image based on the sum image signal on a display section in accordance with a switching instruction, wherein the amplified image and the sum image signal are both displayed within the same exposure period.

17. A non-transitory computer readable medium storing a program for causing a computer including an imaging apparatus to perform processing comprising the steps of:
dividing an exposure period to the imaging device into a plurality of times of exposures;
adding individual image signals obtained by the plurality of divided exposures in sequence to generate a sum image signal;
amplifying the sum image signal using a predetermined amplification factor to generate an amplified image signal; and
alternatively displaying an amplified image based on the amplified image signal and a sum image based on the sum image signal on a display section in accordance with a switching instruction, wherein the amplified image and the sum image signal are both displayed within the same exposure period.

18. An imaging apparatus comprising:
an imaging device generating an image signal on a subject image;
a shooting control mechanism dividing an exposure to be made to the imaging device in an exposure period into a plurality of times of exposures;
an adding mechanism adding individual image signals obtained by the plurality of divided exposures in sequence to generate a sum image signal;
an amplification control mechanism amplifying the sum image signal using a predetermined amplification factor in a first period in the exposure period to generate an amplified image signal; and
a display control mechanism displaying, on a display section, the amplified image based on the amplified image signal in the first period, and displaying, on a display section, an image based on the sum image signal in a period other than the first period in the exposure period, wherein the amplified image and the sum image signal are both displayed within the same exposure period.

19. An imaging apparatus comprising:
an imaging device generating an image signal on a subject image;
a shooting control mechanism dividing an exposure period to the imaging device into a plurality of times of exposures;
an adding mechanism adding individual image signals obtained by the plurality of divided exposures in sequence to generate a sum image signal;
an amplification mechanism amplifying the sum image signal using a predetermined amplification factor to generate an amplified image signal; and
a display control mechanism alternatively displaying, on a display section, an amplified image based on the amplified image signal and a sum image based on the sum image signal in accordance with a switching instruction, wherein the amplified image and the sum image signal are both displayed within the same exposure period.

* * * * *